United States Patent [19]

Roby et al.

[11] Patent Number: 5,478,921
[45] Date of Patent: Dec. 26, 1995

[54] METHOD OF PURIFYING BIOABSORABLE POLYMER

[75] Inventors: Mark S. Roby, Killingworth; Nagabhushanam Totakura, Norwalk, both of Conn.

[73] Assignee: United States Surgical Corporation, Norwalk, Conn.

[21] Appl. No.: 295,977

[22] Filed: Aug. 25, 1994

[51] Int. Cl.$^6$ .............................. C08G 63/08; C08F 6/00
[52] U.S. Cl. ..................... 528/480; 528/354; 528/357; 528/361; 528/487; 528/491; 528/492; 528/495; 528/497
[58] Field of Search .................... 528/354, 357, 528/361, 480, 487, 491, 492, 495, 497

[56] References Cited

U.S. PATENT DOCUMENTS

| | | | |
|---|---|---|---|
| 3,565,869 | 2/1971 | De Prospero | 528/361 X |
| 3,683,511 | 8/1972 | Johnson et al. | 34/9 |
| 4,223,128 | 9/1988 | Halek et al. | 528/481 |
| 4,483,888 | 11/1984 | Wu | 427/336 |
| 4,591,629 | 5/1986 | El-Ghatta et al. | 528/308.2 |
| 4,634,761 | 1/1987 | Mendiratta et al. | 528/500 |
| 4,649,162 | 3/1987 | Roche et al. | 521/78 |
| 4,703,105 | 10/1987 | Allada | 528/483 |
| 4,810,775 | 3/1989 | Bendix et al. | 528/480 |
| 4,892,931 | 1/1990 | Knerr | 528/493 |
| 4,902,780 | 2/1990 | Bourrain et al. | 528/483 |
| 4,918,160 | 4/1990 | Kondoh et al. | 528/483 |
| 4,990,595 | 2/1991 | Traechkner et al. | 528/483 |
| 5,041,529 | 8/1991 | Shinoda et al. | 528/354 |
| 5,049,647 | 9/1991 | Al-Ghatta | 528/272 |
| 5,080,845 | 1/1992 | Herrmann et al. | 264/101 |
| 5,102,983 | 4/1992 | Kennedy | 528/354 |
| 5,106,906 | 4/1992 | Meier et al. | 525/51 |
| 5,221,731 | 6/1993 | Weymans et al. | 528/483 |
| 5,229,486 | 7/1993 | Paul et al. | 528/483 |
| 5,237,048 | 8/1993 | Miyakawa et al. | 528/483 |
| 5,248,763 | 9/1993 | Kirsch et al. | 528/490 |
| 5,250,658 | 10/1993 | Paul et al. | 528/490 |
| 5,356,538 | 10/1994 | Wai et al. | 210/634 |

OTHER PUBLICATIONS $CO_2$ in Solvent Extraction, Papers presented at a meeting of the SCI Food Engineering Panel, London, 2 Feb. 1982, $CO_2$ as a solvent: its properties and applications, H. Brogle.

Design and Control of $CO_2$ Extraction Plants, presented at the 2nd International Symposium on Supercritical Fluids: May 20–27, 1991, Boston, Mass., Sims et al.

Marc Sims SFE product literature: Supercritical Fluid Process Development Unit.

*Primary Examiner*—Shelley A. Dodson

[57] ABSTRACT

A method for purifying a material containing a bioabsorbable polymer involves contacting the polymer with an extractant under supercritical conditions of temperature and pressure to extract residual impurities from the polymer and thereafter recovering the purified polymer. The method sharply reduces residual monomer levels in bioabsorbable polymers without altering polymer viscosity or melting point.

22 Claims, No Drawings

METHOD OF PURIFYING BIOABSORABLE POLYMER

BACKGROUND

1. Technical Field

This disclosure relates to a method of purifying a bioabsorbable polymer and, more particularly, to a method of extracting organic and inorganic impurities such as solvents, additives, monomers, oligomers, and the like, from a bioabsorbable polymer using supercritical fluid extraction (SFE).

2. Background of Related Art

A supercritical fluid is a dense gas that is maintained above its critical temperature, i.e., the temperature above which it cannot be liquified by pressure. Supercritical fluids exhibit a unique combination of solvent and transport properties and have been employed in the extraction of impurities from a wide variety of polymeric materials. See, e.g., U.S. Pat. Nos. 4,703,105, 4,892,931, 4,902,780, 4,918,160, 4,990,595, 5,049,647, 5,221,731, 5,229,486, 5,237,048, 5,248,763 and 5,250,658.

Bioabsorbable polymers have been employed in the fabrication of a broad range of implantable medical/surgical devices, prostheses, implants, and the like. After being implanted inside the body, a medical/surgical device fabricated from a bioabsorbable polymeric material will hydrolyrically degrade into harmless substances. Such polymers are extremely useful because they obviate the necessity for a subsequent surgical operation to remove the device after the healing process has been completed. Furthermore, such polymers exhibit predictable physical properties such as strength, toughness, etc. which are critical to their use in medical applications. However, because of their sensitivity to a number of environmental conditions, methods for purifying the polymers have generally been limited to those which do not expose the polymers to severe conditions, such as high temperatures and pressures.

One method for purifying bioabsorbable polymers includes contacting particles of impurity-laden bioabsorbable polymer, e.g., polyglycolic acid, with a flowing stream of a substantially dry, oxygen-free inert gas as disclosed in U.S. Pat. No. 3,565,869. The gas employed in this method, however, is not maintained under supercritical conditions of temperature and pressure. This method has been criticized (see U.S. Pat. No. 5,041,529) as a method which ineffectively removes impurities, requires several tens of hours to reduce residual monomer levels to below 2% and, furthermore, one which results in decomposition of the polymer.

Another method for purifying bioabsorbable polyesters includes dissolving the polymer in a solvent and thereafter contacting the solution with a precipitation agent under the effect of high shear forces in a turbulent shear field as disclosed in U.S. Pat. No. 4,810,775. A drawback to this method is that extremely flammable solvents and/or precipitation agents such as petroleum ether are frequently used.

Yet another method for purifying bioabsorbable polyesters includes treating the polyester under reduced pressure in a reaction system while maintaining the polyester in the molten state during the second half of the polymerization reaction as disclosed in U.S. Pat. No. 5,041,529.

The aforementioned methods do not employ a supercritical fluid in the purification of bioabsorbable polyesters.

SUMMARY

The present method for purifying a bioabsorbable polymer involves contacting the polymer with an extractant under supercritical conditions of temperature and pressure to extract residual impurities from the polymer and thereafter recovering the resulting purified polymer.

The method described herein offers considerable advantages over known methods of purifying bioabsorbable polymers. For example, in particularly useful embodiments, the method can be carried out in a relatively short period of time, i.e., in some cases in about an hour, and at relatively low temperatures. Furthermore, where the material to be purified is a blend or composite of two or more distinct polymers having different melting points, temperature and pressure can be modified appropriately during the period for carrying out the method herein in order to successfully extract the impurities from one or more of the polymers which make up the blend or composite without adversely affecting the physical characteristics of the blend or composite. The method results in a substantial reduction of impurities without adversely affecting the molecular weight, viscosity and other physical properties of the polymer. In addition, in comparison to known extraction methods, more thorough extractions can be obtained by the method herein, normally obviating the necessity of further purification of the polymer.

DETAILED DESCRIPTION OF PREFERRED EMBODIMENTS

The materials purified of residual impurities in accordance with the novel method described herein include bioabsorbable polymers which can be fabricated from such monomers as glycolic acid, glycolide, lactic acid, lactide, p-dioxanone, trimethylene carbonate, dimethylene trimethylene carbonate, dioxepanone, alkylene oxalates, epsilon-caprolactone, and the like. The material can be a homopolymer, copolymer, polymeric blend or polymeric composite. Preferred compositions are the homopolymers and copolymers derived from glycolic acid, glycolide, lactic acid and/or lactide. Particularly preferred are the random, block and/or graft copolymers of glycolide and lactide, e.g., a random copolymer composed of approximately 92.5 weight percent glycolide and 7.5 weight percent lactide. The polymer can be treated in accordance with the method herein while in the molten or solid state, preferably while in the solid state. In a particularly preferred embodiment, the polymer is first molded into a surgical article, e.g., a surgical staple, clip, pin, etc., and the molded article thereafter subjected to the method herein.

The present method is normally carried out by contacting the above-mentioned polymer or polymer blend with an extractant under supercritical conditions of temperature and pressure in any suitable extraction apparatus. The particular type of extraction apparatus utilized herein is not limited so long as the extraction apparatus enables good contact of the polymer with the extractant. The basic operation of extraction apparatus is well known to those skilled in the art and is described in Sims and Thompson, *Design and Control of $CO_2$ Extraction Plants* (Presented at the 2d International Symposium on Supercritical Fluids, May 20–22, 1991, Boston Mass.). Multiple extraction units can be arranged in parallel to effect the extraction in a continuous process or they can be arranged in series, thereby flowing the polymer and extractant, e.g., in a counter current manner, to effect continuous extraction.

The extractants which can be utilized for the treatment of the above-mentioned materials include carbon dioxide, dinitrogen oxide, carbon disulfide, aliphatic hydrocarbons such as ethane, ethylene, propane, butane, pentane and hexane, halogenated hydrocarbons, aromatic hydrocarbons such as benzene, toluene and xylene and alcohols such as methanol and ethanol and mixtures of two or more of the foregoing extractants. Carbon dioxide or mixtures of $CO_2$ with one or more of the above-mentioned extractants are preferred extractants. Typically, the extractant which is employed will be gaseous at normal temperatures and pressures and/or will have a boiling point of not more than about 150° C. at normal pressures. The specific temperatures and pressures used in any given case will vary depending on the particular polymer being purified and the type of extractant being employed. For reference, the critical constants of the aforementioned extractants are shown in Table I as follows.

TABLE I

Critical Constants of Extractants

| Extractant | Critical Temp. $T_c$ (°C.) | Critical Pressure, $P_c$ (bar) | Boiling Point, (°C.) |
|---|---|---|---|
| Carbon dioxide | 31.2 | 74.0 | −78.3* |
| Dinitrogen oxide | 36.8 | 72.7 | −88.8 |
| Carbon disulfide | 276.4 | 77.0 | 46.4 |
| Ethane | 32.4 | 48.9 | −88.4 |
| Ethylene | 9.8 | 51.2 | −103.6 |
| Propane | 96.7 | 42.6 | −41.9 |
| Butane | 152.6 | 38.0 | 0 |
| Pentane | 197.0 | 33.7 | 36.2 |
| Hexane | 234.9 | 30.3 | 68.9 |
| Benzene | 289.0 | 48.3 | 80.3 |
| Tolvene | 320.1 | 42.1 | 110.7 |
| Xylene | 358.1 | 37.4 | 144.5 |
| Methanol | 240.0 | 79.7 | 64.8 |
| Ethanol | 242.8 | 63.9 | 78.5 |

*Sublimination

Generally, the temperature employed in carrying out the method herein is usually about 0.5 to about 5.0 times the critical temperature of the extractant, i.e., preferably from about 20° C. to about 150° C., more preferably from about 40° C. to about 125° C. and most preferably from about 80° C. to about 120° C. The pressure employed in carrying out the method herein is usually about 0.5 to about 10 times the critical pressure of the extractant, i.e., preferably from about 15 to about 800 bar, more preferably from about 35 to about 500 bar and most preferably from about 50 to about 350 bar. The polymer is preferably maintained in contact with the extractant for a period of time generally not exceeding about 6 hours, more preferably from about 0.1 to about 3 hours and most preferably from about 0.5 to about 1.5 hours. The amount of extractant employed can vary widely and generally depends on the extractant being employed and the nature of the polymer being purified. In general, the weight ratio of polymer to extractant will range from about 1:10 to about 1:150 and preferably from about 1:50 to about 1:125. The impurities which are removed from the polymer can contain solvents, monomers, oligomers, catalysts, and the like. The amount of such impurities recovered can range from as high as 10 weight percent to as low as 0.01 weight percent based on the weight of the polymer prior to extraction. The purity of the bioabsorbable polymer after extraction using supercritical fluids can be greater than 99%.

The following non-limiting examples illustrate the practice of the present extraction method.

EXAMPLES 1–2

Two samples, i.e., Examples 1 and 2, of a 92.5:7.5 weight percent random glycolide-lactide copolymer were extracted with carbon dioxide under supercritical conditions. Polymer Examples 1 and 2 weighed 10.14 g and 10.01 g, respectively, before extraction. The examples were primarily free flowing brownish transparent pellets. The extraction apparatus utilized was a Dense Gas Management System (Marc Sims SFE, Berkeley, Calif.) equipped with a 100 cc stainless steel extractor vessel. The samples were enclosed in a 25 cc sample cartridge having stainless steel filters (10 micron) at the inlet and outlet. Flow of $CO_2$ was upward through the sample. The $CO_2$ was ultrapure SFE-SFC grade and was not recycled but vented after passing through the separator and flow measuring instruments.

A glass U-tube separator packed with pyrex wool was maintained at about 0° C. and recovered the extract containing the impurities.

The parameters for the supercritical fluid extraction are summarized in Table II as follows.

TABLE II

Extraction Data for Examples 1 and 2

| Example | Extraction Pressure, bar | Extraction Temp., °C. | Amount of $CO_2$, g | Extraction Time, min | Extract Weight, mg, | Extract Yield % |
|---|---|---|---|---|---|---|
| 1 | 350 | 80 | 680 | 62 | 75.5 | 0.75 |
| 2 | 350 | 120 | 1220 | 120 | 246.9 | 2.47 |

As can be seen from the above data, extracts containing impurities were recovered from both Examples 1 and 2 utilizing the method herein.

Examples 1 and 2 were recovered after being extracted and were examined for residual monomer by NMR, along with comparative samples obtained from the same copolymer lot for comparison. The comparative samples included an "as extruded" sample, i.e., a sample obtained directly after the polymer was extruded, and a "post-treated" sample, i.e., a sample which had been heated for 10 hours at 120° C. in a vacuum oven. The qualitative results of NMR analyses on the extracted polymers of Examples 1 and 2 and the two comparative samples show decreasing amount of monomer as follows:

As Extruded > Post-treated > SFE at 80° C. > SFE at 120° C.

Specifically, the foregoing progression was determined by the observation of the monomer signal relative to the noise bandwidth of the NMR baseline.

The recovered polymers of Examples 1 and 2 and the as-extruded and post-treated samples were also subjected to viscosity and melting point determinations. Results were as follows:

TABLE III

Viscosity and Melting Point Analyses

| Polymer | Viscosity (dL/g) | Melting Point, °C. |
|---|---|---|
| As Extruded | 1.37 | 186.5 |
| Post Treated | 1.40 | 188.2 |
| Example 1 | 1.32 | 187.6 |
| Example 2 | 1.40 | 186.6 |

These data show that, in contrast to the method disclosed in U.S. Pat. No. 3,565,869, the method disclosed herein has little, if any, effect on the viscosity and melting point of the polymers purified by the method herein. Extracts from both Examples 1 and 2, which were semisolid and soluble in methylene chloride, were examined by NMR and found to contain glycolide and lactide monomer and possibly some free glycolic acid, lactic acid and/or oligomers.

Supercritical fluid extraction therefore sharply reduces residual monomer levels in bioabsorbable polymers without altering polymer viscosity or melting point.

It will be understood that various modifications may be made to the embodiments disclosed herein. For example, the polymer may be subjected to the extraction method herein while in the molten state and the extractant can be recycled and reused. Therefore, the above description should not be construed as limiting, but merely as exemplifications of preferred embodiments. Those skilled in the art will envision other modifications within the scope and spirit of the claims appended hereto.

What is claimed is:

1. A method of purifying a composition containing a bioabsorbable polymer which comprises contacting the polymer with an extractant under supercritical conditions of temperature and pressure to extract residual impurities from the polymer and recovering the purified polymer.

2. The method of claim 1 wherein the composition is selected from the group consisting of a homopolymer, copolymer, polymeric blend and polymeric composite.

3. The method of claim 1 wherein the polymer is fabricated from one or more monomers selected from the group consisting of glycolic acid, glycolide, lactic acid, lactide, p-dioxanone, trimethylene carbonate, dimethylene trimethylene carbonate, dioxepanone, alkylene oxalates and epsilon-caprolactone.

4. The method of claim 1 wherein the polymer is fabricated from one or more monomers selected from the group consisting of glycolic acid, glycolide, lactic acid and lactide.

5. The method of claim 1 wherein the polymer is a copolymer fabricated from glycolide and lactide.

6. The method of claim 1 wherein the polymer is in the solid state.

7. The method of claim 1 wherein the polymer is molded into a surgical article prior to contacting the polymer with the extractant under supercritical conditions of temperature and pressure.

8. The method of claim 1 wherein the extractant is selected from the group consisting of carbon dioxide, dinitrogen oxide, carbon disulfide, aliphatic hydrocarbons, ethane, ethylene, propane, butane, pentane, hexane, halogenated hydrocarbons, aromatic hydrocarbons, benzene, tolvene, xylene, alcohols, methanol, ethanol and mixtures thereof.

9. The method of claim 1 wherein the extractant contains carbon dioxide.

10. The method of claim 1 wherein the supercritical conditions comprise a pressure of from about 15 to about 800 bar and a temperature of from about 20° to about 150° C.

11. The method of claim 1 wherein the supercritical conditions comprise a pressure of from about 35 to about 500 bar and a temperature of from about 50° to about 125° C.

12. The method of claim 1 wherein the supercritical conditions comprise a pressure of from about 50 to about 350 bar and a temperature of from about 80° to about 120° C.

13. The method of claim 1 wherein the polymer is contacted with the extractant for a period of time which ranges from about 0.1 to about 3 hours.

14. The method of claim 1 wherein the polymer is contacted with the extractant for a period of time which ranges from about 0.5 to about 1.5 hours.

15. The method of claim 1 wherein the polymer and extractant are in a weight ratio of from about 1:10 to about 1:150.

16. The method of claim 1 wherein the polymer and extractant are in a weight ratio of from about 1:50 to about 1:125.

17. The method of claim 1 wherein the amount of residual impurities extracted ranges from about 0.01 to about 10 weight percent based on the weight of the polymer prior to being contacted with extractant.

18. The method of claim 1 wherein the polymer is fabricated from at least one monomer selected from the group consisting of glycolic acid, glycolide, lactic acid and lactide, the extractant contains carbon dioxide, the supercritical conditions include a pressure of from about 35 to about 350 bar and a temperature of from about 50° to about 125° C., the polymer and extractant are in a weight ratio of from about 1:10 to about 1:150 and the polymer is contacted with the extractant for a period of time which ranges from about 0.1 to about 3 hours.

19. The method of claim 18 wherein the polymer is in the solid state.

20. The method of claim 18 wherein the amount of residual impurities extracted ranges from about 0.01 to about 10 weight percent based on the weight of the polymer prior to being contacted with extractant.

21. A method of purifying a composition containing a bioabsorbable polymer selected from the group consisting of a homopolymer, copolymer, polymeric blend and polymeric composite fabricated from one or more monomers selected from the group consisting of glycolic acid, glycolide, lactic acid, lactide, p-dioxanone, trimethylene carbonate, dimethylene trimethylene carbonate, dioxepanone, alkylene oxalates and epsilon-caprolactone which comprises:

contacting the polymer with an extractant selected from the group consisting of carbon dioxide, dinitrogen oxide, carbon disulfide, aliphatic hydrocarbons, ethane, ethylene, propane, butane, pentane, hexane, halogenated hydrocarbons, aromatic hydrocarbons, benzene, toluene, xylene, alcohols, methanol, ethanol and mixtures thereof under supercritical conditions of pressure in the range of from about 15 to about 800 bar and temperature in the range of from about 20° to about 150° C. to extract residual impurities from the polymer, and recovering the purified polymer.

22. A method of purifying a composition containing a solid bioabsorbable polymer selected from the group consisting of a homopolymer, copolymer, polymeric blend and polymeric composite fabricated from one or more monomers selected from the group consisting of glycolic acid, glycolide, lactic acid, lactide, p-dioxanone, trimethylene carbonate, dimethylene trimethylene carbonate, dioxepanone, alkylene oxalates and epsilon-caprolactone which comprises:

contacting the polymer with an extractant selected from the group consisting of carbon dioxide, dinitrogen oxide, carbon disulfide, aliphatic hydrocarbons, ethane, ethylene, propane, butane, pentane, hexane, halogenated hydrocarbons, aromatic hydrocarbons, benzene, toluene, xylene, alcohols, methanol, ethanol and mixtures thereof under supercritical conditions of pressure in the range of from about 15 to about 800 bar and temperature in the range of from about 20° to about 150° C. to extract residual impurities from the polymer, and recovering the purified polymer.

* * * * *